US008463416B2

(12) United States Patent
Ruml et al.

(10) Patent No.: US 8,463,416 B2
(45) Date of Patent: *Jun. 11, 2013

(54) SYSTEM AND METHOD FOR ON-LINE PLANNING UTILIZING MULTIPLE PLANNING QUEUES

(75) Inventors: Wheeler Ruml, Palo Alto, CA (US); Minh Binh Do, Mountain View, CA (US); Rong Zhou, San Jose, CA (US)

(73) Assignee: Xerox Corporation, Norwalk, CT (US)

( * ) Notice: Subject to any disclaimer, the term of this patent is extended or adjusted under 35 U.S.C. 154(b) by 938 days.

This patent is subject to a terminal disclaimer.

(21) Appl. No.: 12/504,063

(22) Filed: Jul. 16, 2009

(65) Prior Publication Data

US 2009/0268247 A1    Oct. 29, 2009

Related U.S. Application Data

(63) Continuation of application No. 11/807,472, filed on May 29, 2007, now Pat. No. 7,590,464.

(51) Int. Cl.
*G06F 19/00*      (2011.01)
(52) U.S. Cl.
USPC .......................................... 700/101; 709/223
(58) Field of Classification Search
USPC ............. 700/97–100, 121, 95, 102–110, 224;
709/226, 223; 718/102; 706/10, 16, 4, 42
See application file for complete search history.

(56) References Cited

U.S. PATENT DOCUMENTS

| | | | |
|---|---|---|---|
| 6,872,015 B2 * | 3/2005 | Roosen et al. ................... | 400/61 |
| 6,898,475 B1 * | 5/2005 | Ruml et al. .................... | 700/103 |
| 2004/0179230 A1 * | 9/2004 | Kitada et al. ................... | 358/1.15 |

OTHER PUBLICATIONS

Ye et al., "Job scheduling methods for reducing waiting time variance" Dec. 27, 2005, Information and Systems Assurance Laboratory, pp. 1-19.
Weinberg, Jonathan, "Job Scheduling on Parallel Systems" University of California, San Diego, pp. 1-12.
"Windows Compute Cluster Server 2003 operations overview", Jun. 6, 2006, pp. 1-18.
Ruml et al., "On-line Plannng and Scheduling for High-speed Manufacturing" American Association for Artificial Intelligence, Copyright 2005, 10 pgs.
Ruml et al., "On-line Planning and Scheduling in a High-speed Manufacturing Domain" 7 pgs.

\* cited by examiner

*Primary Examiner* — Kidest Bahta
(74) *Attorney, Agent, or Firm* — Fay Sharpe LLP (57) ABSTRACT

Features described herein relate to concurrently processing multiple batches of job requests for one or more machines and/or components thereof, using a plurality of job planning queues. Each batch of job requests is allocated to a planning queue, and each planning queue comprises an unplanned subqueue that stores unplanned jobs, an unsent subqueue that stores planned jobs waiting to be executed, and a sent subqueue that stores planned jobs that have been output to the machine(s) for execution. A job planner and related components determine which unsent subqueue has the fewest planned jobs at a given point in time, and selects an unplanned job from the unplanned subqueue in the same planning queue as the identified unsent subqueue. The planner then generates a plan for the selected job and inserts the planned job into the unsent subqueue for eventual output to the machine(s) for execution. In this manner, the unsent subqueues for each planning queue are maintained with substantially equal numbers of planned jobs ready for execution, which improves throughput by ensuring that all machines and/or associated components are kept busy.

20 Claims, 5 Drawing Sheets

SYSTEM AND METHOD FOR ON-LINE PLANNING UTILIZING MULTIPLE PLANNING QUEUES

CROSS REFERENCE TO RELATED PATENTS AND APPLICATIONS

This application is a continuation of U.S. patent application Ser. No. 11/807,472, filed May 29, 2007, titled "SYSTEM AND METHOD FOR ON-LINE PLANNING UTILIZING MULTIPLE PLANNING QUEUES." That application is hereby fully incorporated by reference.

The following patents/applications, the disclosures of each being totally incorporated herein by reference are mentioned:

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. Publication No. US-2006-0132815-A1, Published Jun. 22, 2006, entitled "PRINTING SYSTEMS," by Robert M. Lofthus, et al.;

U.S. Publication No. US-2006-0227350-A1, Published Oct. 12, 2006, entitled "SYNCHRONIZATION IN A DISTRIBUTED SYSTEM," by Lara S. Crawford, et al.;

U.S. Publication No. US-2006-0230403-A1, Published Oct. 12, 2006, entitled "COORDINATION IN A DISTRIBUTED SYSTEM," by Lara S. Crawford, et al.;

U.S. Publication No. US-2006-0230201-A1, Published Oct. 12, 2006, entitled "COMMUNICATION IN A DISTRIBUTED SYSTEM," by Markus P. J. Fromherz, et al.;

U.S. Publication No. US-2006-0235547-A1, published Oct. 19, 2006, entitled "ON-THE-FLY STATE SYNCHRONIZATION IN A DISTRIBUTED SYSTEM," by Haitham A. Hindi;

U.S. Publication No. US-2006-0250636-A1, published Nov. 9, 2006, entitled "PRINTING SYSTEM AND SCHEDULING METHOD," by Austin L. Richards;

U.S. Publication No. US-2006-0269310-A1, Published Nov. 30, 2006, entitled "PRINTING SYSTEMS," by Kristine A. German, et al.;

U.S. Publication No. US-2006-0268318-A1, Published Nov. 30, 2006, entitled "PRINTING SYSTEM," by Robert M. Lofthus, et al.;

U.S. Publication No. US-2006-0268317-A1, Published Nov. 30, 2006, entitled "SCHEDULING SYSTEM," by Robert M. Lofthus, et al.;

U.S. Publication No. US-2006-0280517-A1, Published Dec. 14, 206, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. Publication No. US-2006-0285159-A1, Published Dec. 21, 2006, entitled "METHOD OF ORDERING JOB QUEUE OF MARKING SYSTEMS," by Neil A. Frankel;

U.S. Publication No. US-2007-0002085-A1, Published Jan. 4, 2007 entitled "HIGH AVAILABILITY PRINTING SYSTEMS," by Meera Sampath, et al.;

U.S. application Ser. No. 11/359,065, filed Feb. 22, 2005, entitled "MULTI-MARKING ENGINE PRINTING PLATFORM", by Martin E. Banton;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.; and U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.

BACKGROUND

Various features described herein relate generally to a tightly-integrated parallel printing architecture and more specifically to print job plan optimization.

On-line planning and scheduling is a key technique for high-speed manufacturing. An important problem in this area is in what order to consider scheduling jobs that belong to different batches that are being produced simultaneously, in order to minimize the time it takes to complete all batches. The problem becomes more complicated when unknown batches may arrive at any time, and when jobs in the same batch must be completed in order.

A21884 (Markus Fromhertz and Daniel Bobrow): "Predictive and Preemptive Planning and Scheduling for Different Job Priorities" discusses the problem of giving preferences to jobs with higher priority when deciding which jobs to plan next. This requires users to give an explicit priority value for each job.

In a manufacturing plant that can process multiple batches of jobs at the same time, it is important to coordinate the production of these concurrent batches in a way that optimizes some performance objective, such as maximizing the overall throughput of the plant. Typically the planner/scheduler only plans one job at a time, fitting in the new job around the constraints from the previous jobs. A simple approach that has been investigated in the past is to merge different batches to form a single stream of job descriptions that contains jobs from all concurrent batches. However, because there are many possible ways to interleave the constituent jobs of two or more batches, this approach relies on a "job linearizer" that computes a linear ordering of all the jobs in the concurrent batches. Linearized jobs are then fed to the planner, which plans in the order in which jobs are received. This method is referred to as the "single-queue approach," since it requires the planner to maintain only a single planning queue. There is an unmet need for systems and methods that overcome the deficiencies described above.

BRIEF DESCRIPTION

According to an aspect, a method for concurrently processing job request batches for machine control comprises receiving multiple batches of job requests, and placing each job request batch in a respective unplanned subqueue of a planning queue. Each planning queue comprises the unplanned subqueue that stores unplanned job requests in its batch, an unsent subqueue that stores planned jobs that have not been output for execution, and a sent subqueue that stores planned jobs that have been output for execution. The method further comprises identifying an unsent subqueue having a shortest length relative to other unsent subqueues, and identifying a job request in the unplanned subqueue in the same planning queue as the shortest unsent subqueue. Once identified, the job request is removed from the unplanned subqueue and a plan for executing the identified job request is generated. The planned job is then inserted into the identified unsent subqueue to increase its length.

According to another aspect, a system that concurrently processes multiple job request batches for multiple machines comprises a planner that receives multiple batches of job requests, and a plurality of planning queues. Each of the planning queues is associated with a batch and comprises an unplanned subqueue that stores unplanned job requests for its batch, an unsent subqueue that stores planned jobs that have not been output for execution, and a sent subqueue that stores planned jobs that have been output for execution. The system further comprises a queue evaluator that identifies an unsent subqueue having a shortest length relative to other unsent subqueues and identifies a job request in the unplanned subqueue in the same planning queue as the shortest unsent subqueue. The planner generates a plan for executing the identified job request, and advances the job request from the unplanned subqueue to the unsent subqueue upon generating the plan for the job request.

BRIEF DESCRIPTION OF THE DRAWINGS

FIG. 2 illustrates a system that provides a multiple-queue approach to job planning for a machine or a plurality of machines in a manufacturing plant or the like;

DETAILED DESCRIPTION

The following description relates to an approach to solving the on-line scheduling problem. The systems and methods discussed herein infer priorities for jobs stored in different planning queues automatically, in real-time, according to an overall objective function (e.g., plant or system throughput, job fairness, cost efficiency, or the like).

Figure 1:
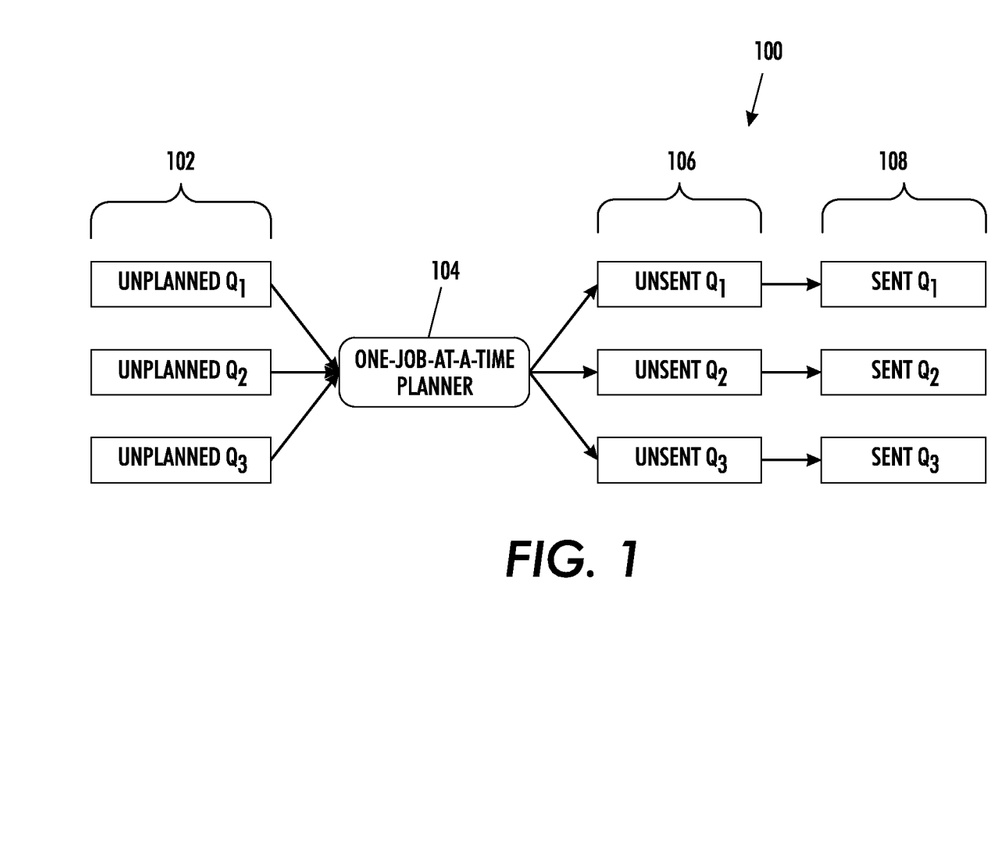
FIG. 1 illustrates a framework for concurrently processing multiple batches of job requests comprising a plurality of planning queues $Q_1$, $Q_2$, $Q_3$, subqueues, and a job planner.

With reference to FIG. 1, a framework 100 is shown comprising a plurality of planning queues $Q_1$, $Q_2$, $Q_3$, subqueues 102, 106, 108, and a job planner 104. In the framework 100, multiple first-in-first-out planning queues are maintained, one for each concurrent batch of jobs to be planned. Each of these planning queues $Q_1$, $Q_2$, $Q_3$ contains three subqueues: an unplanned subqueue 102 (for jobs waiting to be planned), an unsent subqueue 106 (for plans that have been identified but not yet sent to a plant or machine), and a sent subqueue 108 (for plans that have been sent to the plant or machine). The planner 104 chooses which unplanned subqueue to draw from next by trying to keep the same number of unsent plans in the unsent subqueue for each concurrent batch of jobs. Because plans are drawn from the unsent subqueues according to the earliest time they can be executed, scheduling preference is given to batches that can be manufactured or executed faster. In effect, this approach favors a batch that enjoys the highest productivity relative to other batches, using a method that can be executed efficiently online. Individual jobs are scheduled in a manner that maximizes total system throughput, and fairness constraints (e.g. picking the longest-waiting job) can be employed to break ties between otherwise equally qualified jobs or batches (jobs complete at equal rates for each batch). Among other advantages, the framework 100 implicitly gives the online planner 104 the flexibility to choose a job from any concurrent batch as long as it optimizes its objective function, such as maximizing the throughput of the manufacturing plant in which it is employed. It also allows easy integration of other objectives (such as fairness and machine health) as secondary objectives by adding them to the planner as tie-breaking constraints.

Although the conventional single-queue approach is simple and relatively easy to implement from the planner's perspective, it also eliminates a number of flexibilities that the online planner can otherwise enjoy. For example, when a certain job (or job type) is needed to prevent the machine from idling, and the job needed is not located at the beginning of the single queue, a conventional planner has to make plans for all the preceding jobs in the queue, before the desired job can be processed. In the mean time, the planner has to keep track of all the resources used by these planned jobs and resolve any conflicts.

The constraints imposed by the single-queue approach can be lifted because the planner 104 maintains a separate planning queue for each concurrent batch. In the framework 100, the planner 104 has increased freedom in terms of deciding which job to plan for next, because it can choose from a set of jobs instead of a single job as in the single-queue approach. Thus, framework 100 represents a "multiple-queue approach" to online planning and scheduling.

FIG. 1 shows a multiple-queue planning approach for a plant that can process 3 batches concurrently, although more or fewer batches may be processed concurrently in accordance with various aspects described herein, as will be appreciated by those of skill. Each concurrent batch i has its own planning queue $Q_i$ for i=1, 2, and 3. In addition, each queue is further divided into three subqueues: the unplanned subqueue 102 (for jobs waiting to be planned), the unsent subqueue 106 (for plans that have been identified but not yet sent to the plant), and the sent subqueue 108 (for plans that have been sent to the plant for execution).

To process multiple batches concurrently, the planner 104 performs several actions. Initially, the planner 104 fills each empty unplanned subqueue 102 with a batch of jobs waiting to be processed. The planner 104 then identifies the shortest unsent subqueue 106 (e.g., the unsent queue with the fewest jobs, earliest finishing time of all planned jobs, shortest total execution time, etc.). For example, in a scenario involving three concurrently processed job batches, the batch whose unsent subqueue has the fewest jobs in it can be identified as the shortest unsent subqueue. According to other aspects, the "length" of an unsent subqueue is a function of the execution time of the plans contained therein. Note that the plans for different jobs can execute concurrently, thus total execution time of plans for multiple jobs can be different from the summation of the execution time of each individual job. For instance, a first unsent subqueue may have two job plans whose combined execution time is shorter than a single job plan in a second unsent subqueue. In this case, the first unsent subqueue is the shorter of the two despite having more job plans than the second unsent subqueue. The length of an unsent subqueue can also be measured by time at which all jobs in the queue finish. According to other features, the length of an unsent subqueue is a function of a number of actions required to complete the job(s), which may or may not correlate linearly with job execution time because some actions may be performed more quickly than others.

In the event that two unsent subqueues are equal in length and qualify as the shortest subqueue, secondary objectives and/or fairness constraints can be employed to select between the otherwise equal unsent subqueues. The planner 104 then identifies a job that is at the head of the unplanned subqueue 106 that belongs to the same batch as the identified shortest unsent subqueue 102. For example, if the unsent subqueue 106 of $Q_2$ is identified as the shortest unsent subqueue, then the planner 104 identifies the next job in the unplanned subqueue 102 of $Q_2$. In this manner, jobs in the unplanned subqueue of $Q_2$ can be planned and added to the unsent subqueue 106 of $Q_2$ until it is no longer the shortest unsent subqueue. To this end, the planner 104 removes the identified job from its unplanned subqueue 102, generates a plan for executing the job, and inserts the resulting planned job into the corresponding unsent subqueue 106 (e.g., $Q_2$ according to the above example).

The planner 104 can then evaluate the unsent subqueues 106 for plans that are due for execution, remove them from their unsent subqueues 106, send them to the plant or machine for execution, and then insert them to their corresponding sent subqueues 108. The planner can additionally evaluate whether the job that was identified in the unplanned subqueue 102, planned, and added to the unsent subqueue 106 was the last job in its respective batch. If so, the planner can request a new batch for concurrent processing with the other batches. Regardless, the planner 104 continues to execute the above-described actions iteratively to concurrently process job batches until all batches have been planned, and sent to the plan or machine in which the framework 100 is employed for execution.

While in the approach outlined above, the unplanned subqueues (and/or the sent subqueues) may have different lengths for different batches, constraints are enforced to ensure that all the unsent subqueues are of the same length (e.g., the same number of unsent plans are stored in each unsent subqueue) if all the jobs are not finished planning. This constraint is effectuated by the planner 104 by increasing the length of the shortest unsent subqueue first. As a result, as the speed with which plans are moved from the unsent subqueue 106 to the sent subqueue 108 is increased, so is the speed with which jobs waiting in the unplanned subqueue 102 can be processed by the planner 104. Thus, the rate at which jobs enter the framework 100 matches the rate at which the plant or machine employing the framework 100 can execute them, no matter how complicated the plant or machine is. Thus, this approach favors the batch that enjoys the highest online productivity (or throughput). The planner itself, by way of the schedules it finds, tells the system which batches to feed faster.

An advantage of the described approach is that it is an online approach that does not need any offline estimation of the throughput of the plant. In addition, the approach is easy to implement and has very modest runtime overhead, which is important for online planning and scheduling. In addition to keeping the plant or machine as busy as possible, this approach can also reduce the overhead of planning by avoiding unnecessary bookkeeping of resource allocations for plans that cannot be sent to the plant immediately.

The multiple-queue approach also allows easy integration of secondary objective functions such as fairness and machine health. For example, the multiple-queue approach makes it easy to keep track of a most recent time at which a job was drawn from each unplanned subqueue 102, which can be used as a tie-breaker to select between batches whose unsent subqueues are of equal length. Other objectives can be optimized by inserting them into the planner's overall objective. According to some features, four different tie-breakers include (a) job fairness (e.g., longest-waiting job is selected first), (b) the end time of the current job, (c) the total execution time, or "makespan," of the current job, and (d) the already-incurred makespan of the current job. There are many other tie-breakers that can be used, such as the (estimated) wear and tear on a machine, etc. The multiple-queue approach also reduces the complexity of job scheduling by eliminating the need to have a job linearizer.

For exception handling (or replanning), the framework 100 limits the number of plans adversely affected by machine failures. In a conventional single-queue approach, sending a particular plan to the plant may require that all of its preceding plans in the unsent subqueue be sent as well, even though they may or may not belong to the same batch. As a result, when a failure occurs in the plant, the single-queue approach has to cancel all the plans that have been launched so far, regardless of whether these plans belong to the same batch or not, find new plans for all of jobs, and then send them back to the plant again. In contrast, the described multiple-queue approach reduces the overhead for replanning because it can replan for the set of launched jobs that belong to the same batch as the one affected by the failure, and does not need to replan for jobs in the other batches, which also reduces the number of plans that need to be sent back to the plant after replanning is done. Moreover, since the multiple-queue approach has all the functionalities of the single-queue approach, switching from single queue to multiple queues is a backward-compatible upgrade.

Figure 2:
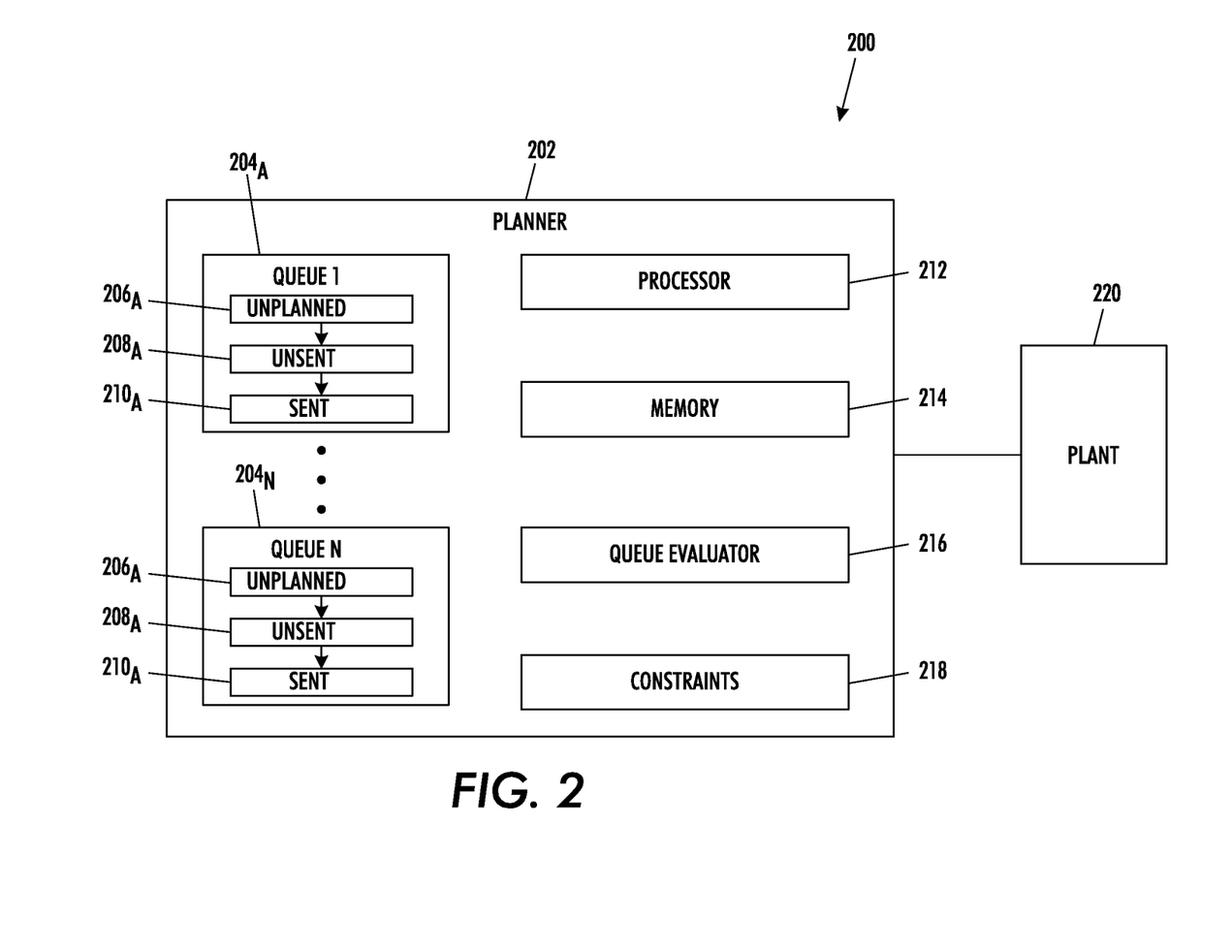

FIG. 2 illustrates a system 200 that facilitates providing a multiple-queue approach to job planning for a machine or a plurality of machines in a manufacturing plant or the like. The system 200 comprises a planner 202, which evaluates job requests from multiple batches of jobs and generates plans that are output to a plant 220 for execution in order to complete the requested job(s). The planner 202 has a plurality of queues 204 that store respective batches of job requests, wherein each batch may comprise job requests related to a single machine or set of machines in a plant. For example, a first queue $204_A$ and an Nth queue $204_N$ are illustrated to show that the planner can comprise any number of planning queues in order to store and concurrently process any desired number of batches of requested jobs. Each queue 204 further comprises a plurality of subqueues, including an unplanned job subqueue 206, and an unsent job subqueue 208, and a sent job subqueue 210. In this regard, each subqueue stores a job request at a different stage of processing. For instance, a received batch of job requests is initially stored in the unplanned job subqueue 206. After a job has been selected from the unplanned job subqueue 206 and a plan there for has been generated by the planner 202, the planned job is stored in the unsent job subqueue 208. After the planned job has been sent to the plant 220 (or machine) for execution, the job is advanced to the sent job subqueue 210.

The planner 202 additionally comprises a processor 212 that executes one or more computer-executable instructions for performing the various actions described herein (e.g., job selection for planning, job planning, job storage in various subqueues, job evaluation, outputting job plans for execution, etc.), which may be stored in persistent or volatile memory 214. Additionally, memory 214 may store information related to received job batches, job status (e.g., unplanned, planned, unsent, sent, etc.), and any other suitable information for performing the various actions and/or executing the algorithms described herein.

Additionally, the planner 202 comprises a queue evaluator 216 that identifies a queue and/or subqueue from which to select a next job for planning by the planner 202. It will be appreciated that the queue evaluator 216 may be a processor similar to processor 212 and/or may be integral to processor 212 as an executable, a software routine, or the like. Queue evaluator 216 identifies an unsent subqueue 208 that is shortest of all the unsent queues. Length may be a function of a number of plans in the unsent queue, total execution time for all plans in the unsent subqueue, a number of actions associated with plans in the unsent subqueue, etc., relative to other unsent subqueues. The planner 202 then identifies a next job in the unplanned subqueue 206 in the same queue as the identified unsent subqueue 208. For instance, if planner maintains five queues 204, and the third queue has the "shortest" unsent subqueue 208, the queue evaluator identifies the next job in the unplanned subqueue 206 of the third queue 204 for planning by the planner 202. The identified job is then removed from the unplanned subqueue 206, planned by the planner 202, and stored to the unsent subqueue 208 of the third queue 204. In this manner, the queue evaluator maintains a substantially equal number of job plans in the unsent subqueues 208 of each queue 204.

The planner 202 furthermore comprises one or more constraints 218 that are enforced to ensure optimal throughput of the planner 202. For example, a constraint can relate to determining from which unplanned subqueue 206 to select a job for planning when two or more unsent subqueues 208 have equal numbers of planned jobs and are "tied" as having the fewest number of planned jobs relative to other unsent subqueues. Such a constraint may dictate that the unplanned subqueue that has more recently had a job removed for planning loses the tie, in which case the planner 202 selects a job from the other unplanned subqueue. In this sense, the job that has been waiting the longest to be selected for planning wins contention for the planner and is selected over one or more jobs that have not been waiting as long; this ensures job fairness. Other constraints may relate to breaking ties in favor of a job that can be most rapidly executed. Still other constraints on tie-breaking may relate to selecting a next job for planning as a function of an end-time of a job that is currently being executed, a makespan of the current job being executed, time already invested in executing the current job, etc, the estimated wear and tear of the plant or machine, and the like. It is to be appreciated that the constraints 218 can also be stored in memory 214 and executed and/or enforced by processor 212. It is further to be appreciated that the system 200 can be employed in a print platform or the like, to process multiple batches of job requests for various components in the print platform. For example, the print platform can be a TIPP print platform such as is described below with regard to FIG. 5, without being limited thereto.

Figure 3:
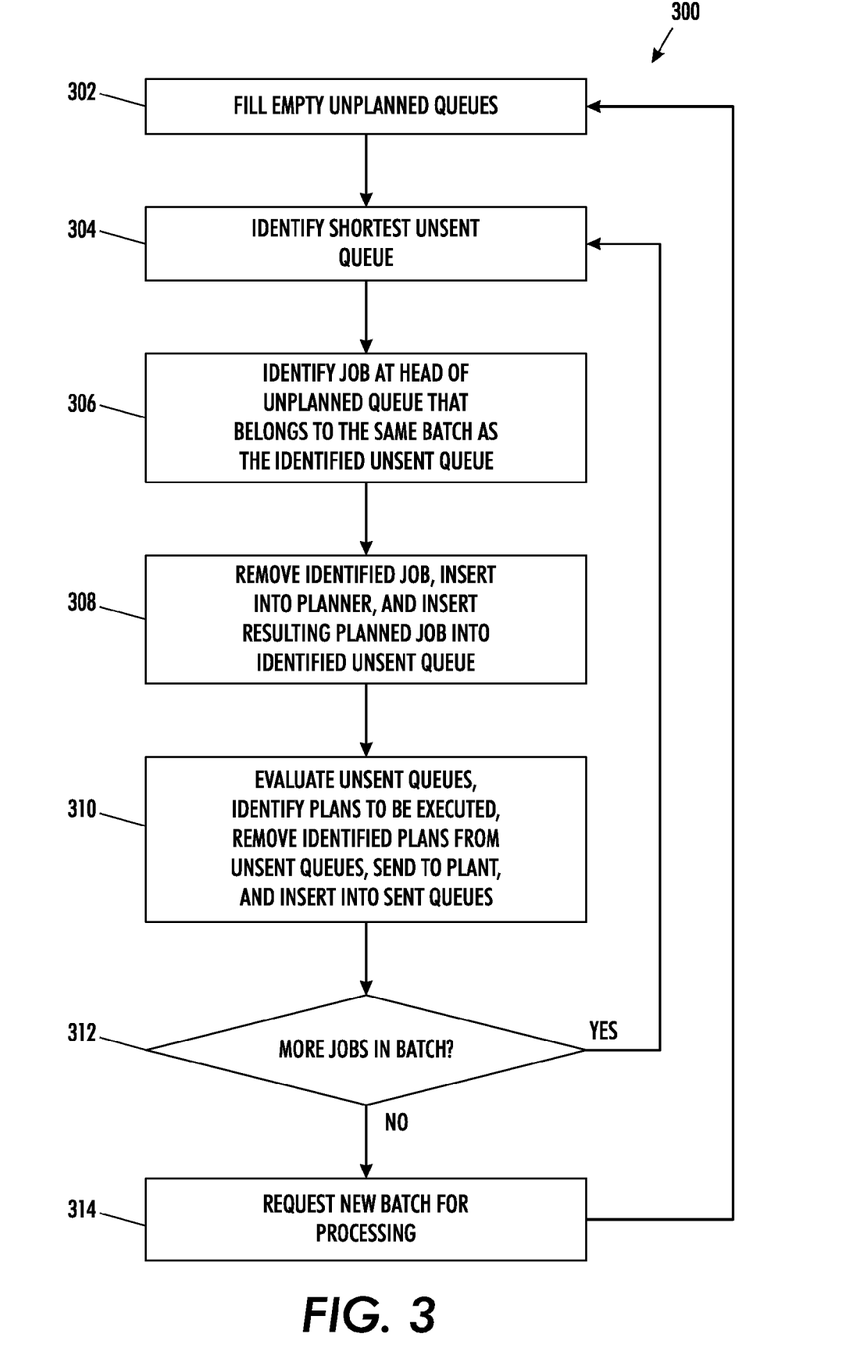
FIG. 3 illustrates a method for concurrently processing multiple job batches using multiple first-in-first-out (FIFO) planning queues, wherein a FIFO planning queue is allocated for each job batch being processed.

FIG. 3 illustrates a method for concurrently processing multiple job batches using multiple first-in-first-out (FIFO) planning queues, wherein a FIFO planning queue is allocated for each job batch being processed. It is to be appreciated that the method may be a set of computer executable routines stored in a computer-readable medium for execution by a planner, such as the planners 104 and/or 202 described above. At 302, job batches that have been received by a planner or the like are used to fill or populate respective "unplanned" subqueues. For example, if four batches of jobs are to be concurrently processed by the planner, then each batch is stored in a respective FIFO unplanned subqueue. Jobs in the unplanned subqueue have not yet been planned by the planner. Each job batch is also associated with a respective "unsent" subqueue, which stores jobs that have been planned but have not yet been sent to the machine or plant for which the job is planned, for execution. Additionally, a "sent" subqueue is maintained for each batch and stores jobs that have been planned and sent out for execution.

At 304, a "shortest" unsent subqueue is identified. For instance, in the above example describing four concurrently processed job batches, the batch whose unsent subqueue has the fewest jobs in it can be identified. According to other aspects, the "length" of an unsent subqueue is a function of the execution time of the plans contained therein. For instance, a first unsent subqueue may have two job plans whose combined execution time (which can overlap) is shorter than a single job plan in a second unsent subqueue. In such a scenario, the first unsent subqueue is the shorter of the two despite having more job plans than the second unsent subqueue. In other examples, the length of an unsent subqueue is a function of a number of actions required to complete the job(s), which may or may not correlate linearly with completion time since some actions may be performed more quickly than others. According to other features, the length of an unsent subqueue can be a function of the finishing time of all plans in this subqueue.

In the event that two unsent subqueues are both the "shortest" unsent subqueues, secondary criteria or constraints can be employed to select between them. Such criteria can include, without being limited to, a preference for the unsent subqueue that has gone a longer time without receiving a newly planned job from the planner (e.g., a preference against the job batch that has more recently had a job planned and inserted into its unsent subqueue). Tie-breaking criteria may further be a function of a scheduled end-time of a job currently being executed by the plant or machine, and preference can be given to selecting a job that can be planned in time to be output for execution by the end of the currently executing job. According to other features, the makespan, or total time to complete the currently executing job, or the already-incurred makespan invested in executing the current job. Additionally, it will be appreciated that all unsent subqueues may be equally short at the inception of the method 300, when the planner has not yet generated any job plans. In this case, the planner may select a job from a first unplanned subqueue in any suitable manner, such as randomly, or by selecting a job from the first subqueue to be filled, etc.

At 306, the job at the head of the unplanned subqueue associated with the same batch as the identified unsent subqueue. That is, once the shortest unsent subqueue is identified at 304, the planner selects a job from the unplanned subqueue for the same batch in order to plan the job and add it to the unsent subqueue in an attempt to ensure that the unsent subqueue is no longer the shortest unsent subqueue. Thus, at 308, the identified job (e.g., the next job in the unplanned subqueue for the job batch associated with the previously identified unsent subqueue) is removed from the unplanned subqueue, inserted into the planner for planning, and the planned job is then inserted into the unsent subqueue to lengthen the unsent subqueue. At 310, all unsent subqueues (e.g., for all batches being concurrently processed) can be evaluated to identify plans for execution. Additionally at 310, identified plans are removed from the unsent subqueues, sent or output to the plant or machine employing the method 300 for execution, and then inserted into their respective sent subqueues (e.g., because their status has changed from unsent to sent).

At 312, a determination is made regarding whether one or more jobs remains in each batch of jobs in the unplanned subqueues. If all unplanned subqueues still have at least one job to be planned, then the method reverts to 304 for another iteration of identifying a shortest unsent subqueue and continues through the actions that follow. In the event that one or more unplanned subqueues is empty (e.g., all jobs in at least one batch have been planned), then at 314 the planner requests a new batch for concurrent processing. The method then reverts to 302 where the new batch is inserted into the empty unplanned subqueue, and the method is continued.

Figure 4:
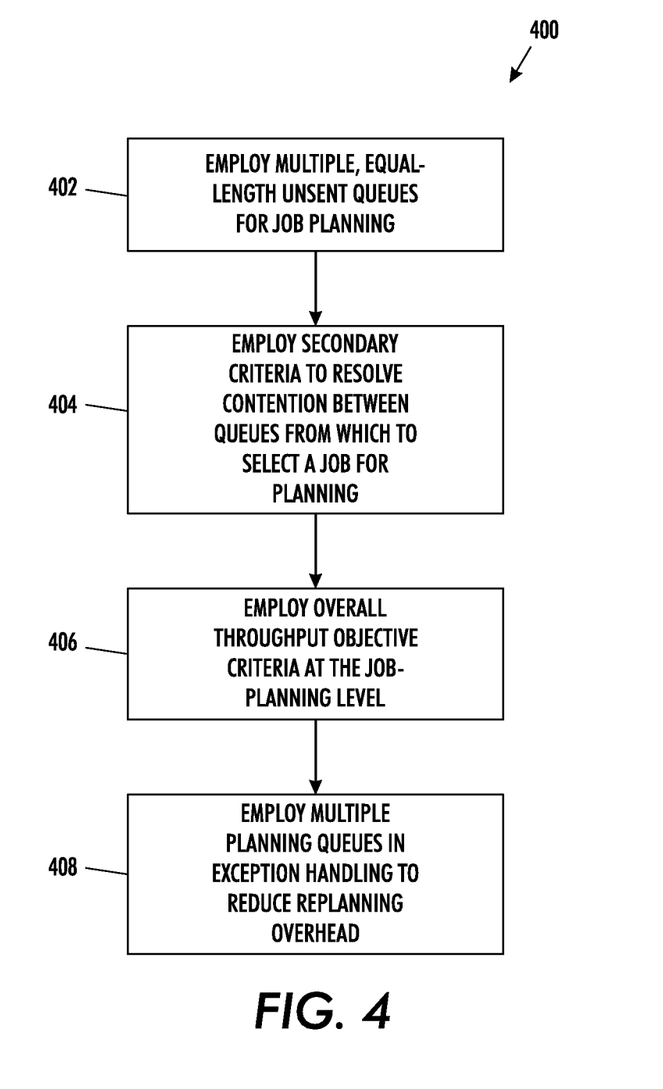
FIG. 4 illustrates a method of maintaining multiple unsent job subqueues at a substantially equal length to optimize system throughput for a manufacturing plant or machine, in accordance with various aspects.

FIG. 4 illustrates a method of maintaining multiple unsent job subqueues at a substantially equal length to optimize system throughput for a manufacturing plant or machine, in accordance with various aspects. At 402, the multiple unsent job subqueues are initiated and employed for storing job plans generated by a planner in response to multiple batches of job requests. At 404, secondary criteria are employed to resolve between queues when identifying a next job for planning. For instance, in a scenario in which two or more unsent subqueues are identified as being "shortest" (e.g., having a smallest number of job plans, a smallest total execution time for all job plans in the unsent queue, etc.) relative to other unsent job subqueues, criteria related to job execution completion time for a currently executed job (e.g., a job that has been planned and output to the plant or machine for execution), as well as criteria related to current job makespan, g-cost, etc., may be considered to determine which of the tied shortest unsent subqueues is associated with the batch from which an unplanned job should be selected next.

At 406, overall throughput criteria are employed at the job-planning level to determine which jobs should be planned next and output to the plant or machine for execution. These criteria may be a function of job execution time, job sequence, such as stamping a metal part before painting it, printing odd pages before printing even pages during a double-sided print job, printing pages before collating them, etc.), or some other parameter(s). Additionally, such criteria may be a function of overall system objectives, including but not limited to increasing product quality, increasing throughput, decreasing cost, improving machine health, or the like.

At 408, multiple planning queues are employed to facilitate exception handling to reduce replanning overhead by limiting the number of plans adversely affected by machine failures. For instance, replanning overhead is reduced by the multiple planning queue scheme because it can replan only for a set of output planned jobs that belong to the batch affected by a machine failure, and therefore jobs in the other batches need not be replanned, which also reduces the number of plans that need to be sent back to the plant after replanning is complete. Moreover, since the multiple-queue approach has all the functionalities of a conventional single-queue approach, it is backward-compatible for systems that employ the single-queue approach.

Figure 5:
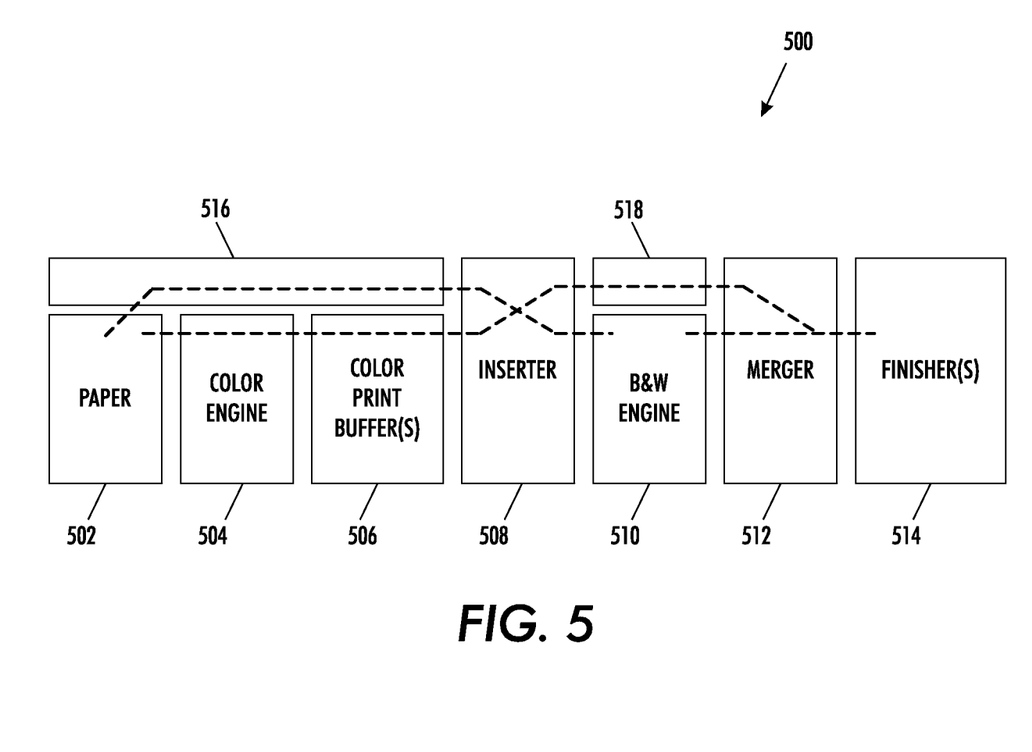
FIG. 5 illustrates a system comprising a plurality of components, such as may be employed in a universal production printer with a color print sheet buffer or a tightly-integrated parallel printer (TIPP) system, which represents an environment in which the various features described herein may be employed.

FIG. 5 illustrates a system 500 comprising a plurality of components, such as may be employed in a universal production printer with a color print sheet buffer or a tightly-integrated parallel printer (TIPP) system, which represents an environment in which the various features described herein may be employed. For instance, the planning systems and methods described above may be employed to generate job plans for concurrently processing multiple batches of print jobs for one or more printers in a printing plant or the like. The system 500 comprises a paper source 502, which may comprise one or more sheets of paper, and which is operatively associated with a color print engine 504 and an inserter 508. Paper from the paper source 502 may follow one of two paths. For instance, paper may be routed from the paper source 502 to the color print engine 504, and then on to a color print buffer 506, before entering the inserter 508. Additionally or alternatively, paper may be routed directly from the paper source 502 to the inserter 508 through the paper path 516 (e.g., bypassing the color engine 504 and the color print buffer 506).

Paper that has been routed directly from the paper source 502 to the inserter 508 may be passed to a black-and-white print engine 510, then through a merger 512 that merges black-and-white and color pages, before proceeding on to a finisher 514 that finishes the document for presentation to a user. Paper that has been routed through the color print engine 504 into the color print buffer 506 for temporary storage until such time as the color-printed page can be merged by merger 512 with other black-and-white pages. After temporarily stored in the print buffer 506, the color pages are passed through the inserter 508 and the paper path 518 to merge with black-and-white pages by the merger 512 It will be appreciated that according to other examples, a page may pass through all components of the system 500 and may have both color portions and black-and-white portions. The actions associated with a job performed by system 500 may be organized into a series of events that define one or more plans for the job.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system, comprising:
   one or more xerographic components that execute plans to process jobs;
   a planner that receives multiple batches of job requests for concurrent parallel processing;
   a plurality of parallel planning queues, each of which is associated with a batch and comprises an unplanned subqueue that stores unplanned job requests for its batch, an unsent subqueue that stores planned jobs that have not been output for execution, and a sent subqueue that stores planned jobs that have been output for execution; and
   a queue evaluator that identifies an unsent subqueue having a shortest length relative to other unsent subqueues and identifies a job request in the unplanned subqueue in the same planning queue as the shortest unsent subqueue; and
   a memory that stores one or more computer-executable routines that are executed by the planner and the queue evaluator;
   wherein the planner generates a plan for executing the identified job request, and advances the job request from the unplanned subqueue to the unsent subqueue upon generating the plan for the job request.

2. The printing system as set forth in claim 1, wherein the queue evaluator evaluates the unsent subqueues in the planning queues, identifies a job plan that is ready to be output to a machine, and wherein the planner removes the job plans from respective unsent subqueues, outputs the job plans to respective machines for execution, and inserts the job plans in respective sent subqueues.

3. The printing system as set forth in claim 2, wherein the queue evaluator determines whether one or more unplanned subqueues is empty, and wherein the planner requests a new batch of job requests and fills an empty unplanned subqueue for continued concurrent processing with other unplanned subqueues.

4. The printing system as set forth in claim 1, wherein the subqueues are first-in-first-out (FIFO) subqueues.

5. The printing system as set forth in claim 1, wherein each planning queue and each batch of job requests is associated with a single or multiple machines.

6. The printing system as set forth in claim 1, wherein the queue evaluator determines the length of an unsent subqueue as a function of a number of planned jobs in the unsent subqueue.

7. The printing system as set forth in claim 6, wherein the queue evaluator determines whether two or more unsent subqueues qualify as the shortest unsent subqueue, and resolves a "tie" condition between two equally qualified shortest unsent subqueues in favor of the unsent subqueue that has less-recently been updated with a job plan.

8. A non-transitory computer-program product comprising computer-executable instructions embodied in a computer-readable medium for concurrently processing job request batches for machine control, the instructions comprising:
  generating and storing a plurality of parallel planning queues, each comprising an unplanned subqueue that stores unplanned job requests, an unsent subqueue that stores planned job that are unsent; and a sent subqueue that stores job requests that have been planned and sent to a device for execution;
  associating each of a plurality of received job request batches with a respective planning queue;
  parallel-processing job request batches; and
  generating and outputting a job plan for each job request in each job request batch.

9. The computer-readable medium as set forth in claim 8, further comprising:
  identifying an unsent subqueue having a shortest length relative to other unsent subqueues;
  identifying a job request in the unplanned subqueue in the same planning queue as the shortest unsent subqueue;
  generating a plan for executing the identified job request; and
  inserting the planned job into the identified unsent subqueue to increase its length.

10. The computer-readable medium as set forth in claim 8, the instructions further comprising evaluating all unsent subqueues in all planning queues, identifying a job plan that is ready to be output to a machine, removing the job plans from respective unsent subqueues, sending the job plans to respective machines for execution, and inserting the job plans in respective sent subqueues.

11. The computer-readable medium as set forth in claim 10, the instructions further comprising determining whether one or more unplanned subqueues is empty.

12. The computer-readable medium as set forth in claim 11, the instructions further comprising requesting a new batch of job requests and filling an empty unplanned subqueue for continued concurrent processing with other unplanned subqueues.

13. The computer-readable medium as set forth in claim 11, the instructions further comprising reiterating the method upon a determination that none of the planning queues is empty.

14. The computer-readable medium as set forth in claim 8, wherein the subqueues are first-in-first-out (FIFO) subqueues.

15. The computer-readable medium as set forth in claim 8, wherein each planning queue is associated with one or more machines, and wherein the batch of job requests that is inserted into the unplanned subqueue of a given planning queue comprises job requests for the machine associated with the planning queue.

16. The computer-readable medium as set forth in claim 8, the instructions further comprising determining the length of an unsent subqueue as a function of a number of planned jobs in the unsent subqueue.

17. The computer-readable medium as set forth in claim 16, the instructions further comprising determining whether two or more unsent subqueues qualify as the shortest unsent subqueue.

18. The computer-readable medium of claim 17, the instructions further comprising resolving a "tie" condition between two equally qualified shortest unsent subqueues as a function of at least one of job fairness, end time of a current job, makespan of the current job, time/cost already invested in the current job, and the estimated wear and tear of the plant or machine.

19. The computer-readable medium as set forth in claim 8, the instructions further comprising determining the length of an unsent subqueue as a function of a total execution time associated with all planned jobs in the unsent subqueue.

20. The computer-readable medium as set forth in claim 8, the instructions further comprising determining the length of an unsent subqueue as a function of the finishing time of all plan jobs in the unsent subqueue.

* * * * *

UNITED STATES PATENT AND TRADEMARK OFFICE
CERTIFICATE OF CORRECTION

| | |
|---|---|
| PATENT NO. | : 8,463,416 B2 |
| APPLICATION NO. | : 12/504063 |
| DATED | : June 11, 2013 |
| INVENTOR(S) | : Ruml et al. |

It is certified that error appears in the above-identified patent and that said Letters Patent is hereby corrected as shown below:

Item (73), Assignee, on the title page of the patent should read "Palo Alto Research Center Incorporated, Palo Alto, CA (US)"

Signed and Sealed this
Twenty-fourth Day of December, 2013

Margaret A. Focarino
*Commissioner for Patents of the United States Patent and Trademark Office*